Oct. 29, 1957  F. A. PARKER ET AL  2,811,372
WHEEL SUSPENSION FOR VEHICLES
Filed March 19, 1957  2 Sheets-Sheet 1
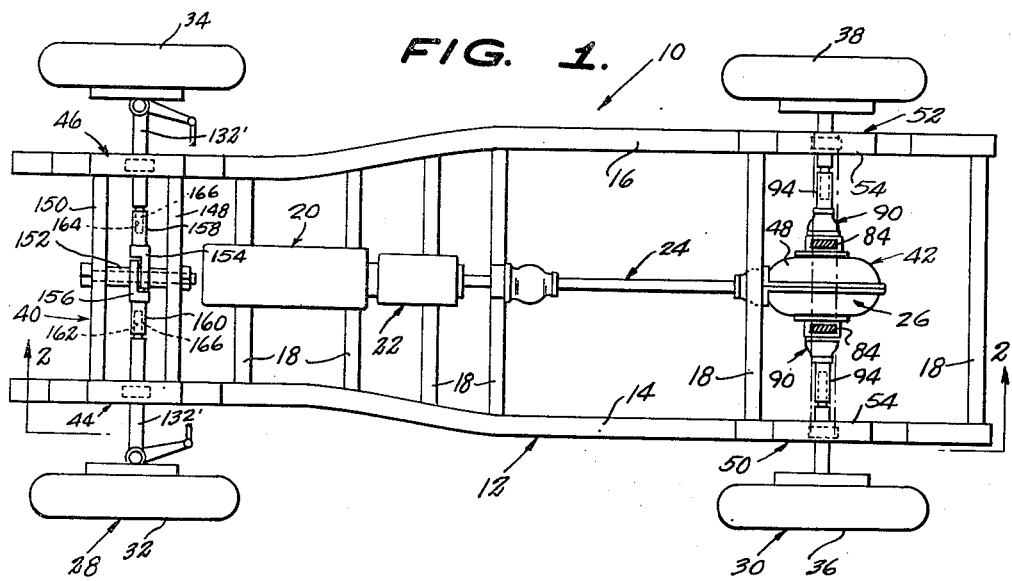
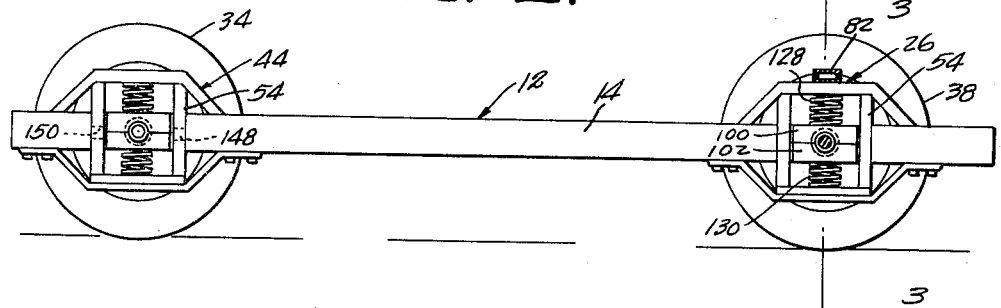
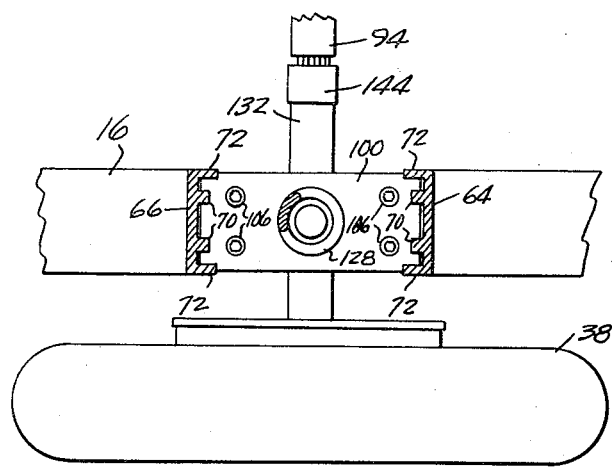
INVENTORS
FREDERICK G. PARKER,
FREDERICK A. PARKER,
BY
McMorrow, Berman & Davidson
ATTORNEYS.

Oct. 29, 1957  F. A. PARKER ET AL  2,811,372
WHEEL SUSPENSION FOR VEHICLES
Filed March 19, 1957  2 Sheets-Sheet 2
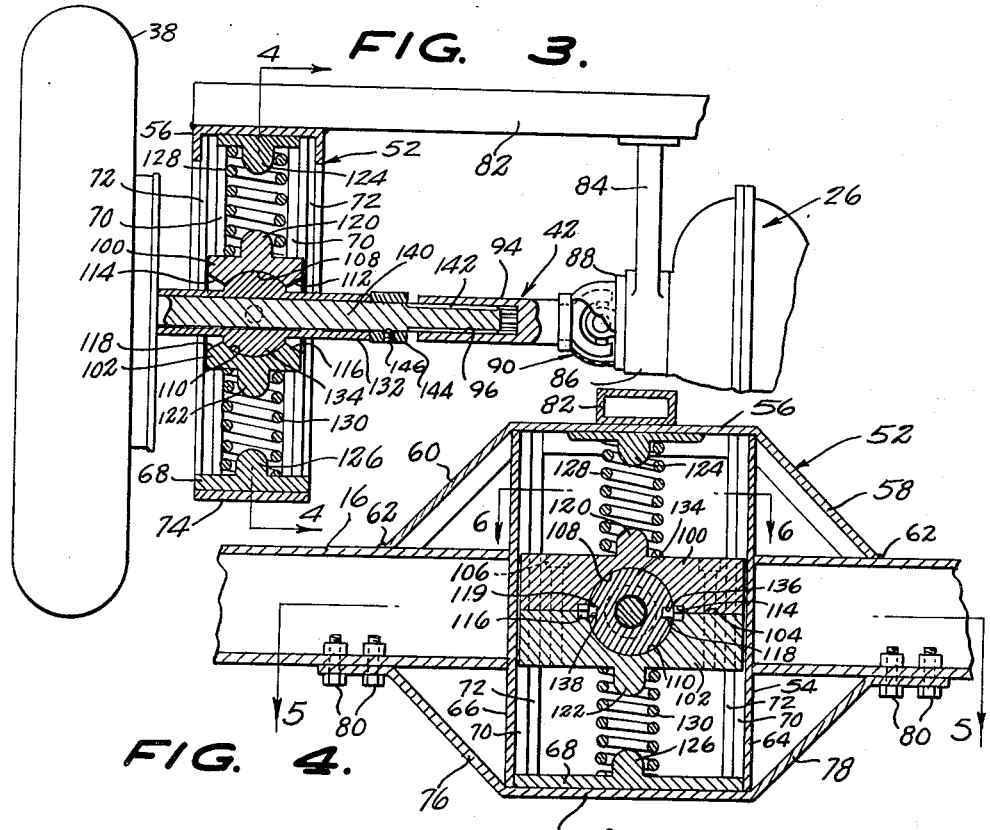
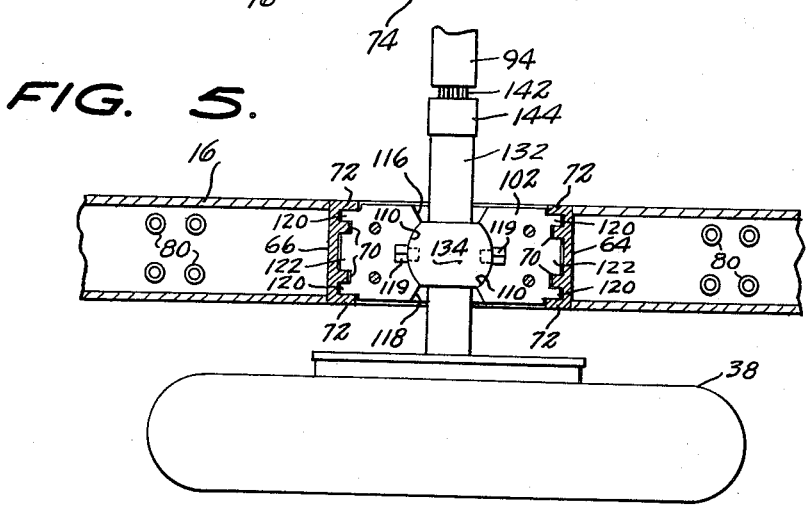
INVENTORS
FREDERICK G. PARKER,
FREDERICK A. PARKER,
BY
McMorrow, Berman + Davidson
ATTORNEYS.

United States Patent Office 2,811,372
Patented Oct. 29, 1957

2,811,372
WHEEL SUSPENSION FOR VEHICLES

Frederick A. Parker, Los Angeles, and Frederick G. Parker, San Gabriel, Calif.

Application March 19, 1957, Serial No. 647,013

2 Claims. (Cl. 280—124)

This invention relates generally to vehicles and is more particularly concerned with the running gear thereof.

A primary object of invention is to provide a novel wheel suspension for vehicles wherein each of the ground engaging wheels are supported for independent "shock absorbing" movement on the vehicle, said wheel suspension permitting utilization of a substantially rigid chassis frame, a maintenance of a low center of gravity in the vehicle affording stability and other attendant advantages, and being useable on passenger, industrial and commercial vehicles having a "two wheel" drive or an "all" wheel drive.

Another object of invention in conformance with that set forth is to provide in a vehicle independently operating wheel suspension assemblies including means for yieldably maintaining the load imposed on the vehicle chassis frame, said means permitting the ground engaging running wheels of the vehicle to have independent movement on a support axle, said axles having vertical pivotal movement about the means yieldably supporting the chassis frame.

A still further object of invention in conformance with that set forth is to provide a wheel suspension for vehicles of the character set forth which is readily and economically manufactured, easily installed and maintained, and highly satisfactory and practical for the purpose intended.

These together with other objects and advantages which will subsequently become apparent reside in the details of construction and operation as more fully hereinafter described and claimed, reference being had to the accompanying drawings forming a part hereof, wherein like numerals refer to like parts throughout, and in which:

Figure 1 is a top plan view of a chassis frame of a vehicle incorporating the novel wheel suspension assemblies thereon;

Figure 2 is a section taken substantially on the plane of line 2—2 of Figure 1;

Figure 3 is an enlarged section taken substantially on the plane of line 3—3 of Figure 2, portions being broken away and shown in section for clarity;

Figure 4 is a fragmentary section taken substantially on the plane of line 4—4 of Figure 3;

Figure 5 is a fragmentary section taken substantially on the plane of line 5—5 of Figure 4; and Figure 6 is a fragmentary section taken substantially on the plane of line 6—6 of Figure 4.

Referring to the drawings in detail, indicated generally at 10 is a vehicle chassis including a chassis frame indicated generally at 12 incorporating a pair of longitudinally extending chassis frame members 14 and 16 having extending transversely therebetween in suitable secured relationship a plurality of longitudinally spaced frame members 18.

The frame will have supported on the members 18 a power plant 20 such as an internal combustion engine, for example, operatively connected to a suitable transmission 22 having extending therefrom a drive shaft 24.

The drive shaft 24 is operatively connected to a differential assembly indicated generally at 26, details of which relative to the specific wheel suspensions being subsequently described.

Indicated generally at 28 is a front steering wheel assembly and indicated generally at 30 is a rear power wheel assembly. The front steering wheel assembly includes suitably supported wheel assemblies 32 and 34 steered in any suitable manner. The rear power wheel assembly includes suitably supported powered wheel assemblies 36 and 38 operatively connected to the differential assembly 26 which affords means providing for locomotion of the vehicle and permitting steering thereof. The front wheel assemblies 32 and 34 are journaled on opposite ends of a front axle assembly indicated generally at 40, and the rear wheel assemblies 36 and 38 are suitably journaled at opposite ends on a rear axle assembly indicated generally at 42 and incorporating intermediately thereof the differential assembly 26.

The front axle assembly 40 is intermediately articulated on a horizontal axis of rotation as will subsequently become apparent, and is yieldably carried on opposite forward intermediate portions of the chassis frame members 14 and 16 by independent similar wheel suspension assemblies indicated generally at 44 and 46. The rear axle assembly is intermediately articulated adjacent the housing 48 of the differential assembly 26 on a horizontal axis of rotation on opposite sides thereof as will subsequently become apparent, and is yieldably carried on opposed rear intermediate portions of the chassis frame members 14 and 16 by independent similar wheel suspension assemblies indicated at 50 and 52 respectively. The wheel suspension assemblies are identical in structure and function, and accordingly only one of the wheel suspension assemblies will be described in detail.

The wheel suspension assemblies 50 and 52 are identical, each of which including a rectangularly conformed support frame 54 extending transversely of the chassis frame members 14 and 16. The horizontal top portion of the frame 54 has a U-shaped cross section and is indicated at 56, including diverging side portions 58 and 60 suitably secured at their lower ends to upper surface portions of the chassis frame members by means of welding 62, for example. The frame 54 includes opposed side members 64 and 66 integral with a transverse bottom plate 68. The side 64 and 66 have extending toward each other a plurality of vertically extending guide ribs 70 and side flanges 72, see Figure 5. Extending beneath the bottom 68 is a support plate 74 incorporating diverging leg portions 76 and 78 suitably secured on an under surface portion of the chassis members 14 and 16 by machine bolts or the like 80. The removable bottom plate 74 provides means for dismantling the wheel suspension assemblies.

Suitably secured on the top portion 56 of the support frames 54 and extending in overlying relationship relative to the chassis frame members 14 and 16 is an elongated support member 82. The support member 82 has depending therefrom in suitably secured longitudinally spaced relationship hanger arms 84 terminating in a lower annular bearing portion 86 circumposed about the power output portion of the differential assembly 26 indicated at 88. The power output portion 88 of the differential assembly is operatively connected to a suitable universal joint assembly indicated generally at 90 one side of which being integral with an elongated tubular sleeve 94 incorporating a splined bore portion 96 opening toward the support frames 54, see Figure 3.

It will be noted that the support frames 54 permit the chassis frame 12 of the vehicle to be substantially lowered thus maintaining a relatively low center of gravity in the vehicle.

The ribs 70 and 72 of the support frames 54 provide ways for a vertically reciprocable support block 98 maintaining the same in uni-planar movement within said support frame. The block 98 incorporates complementary upper and lower block halves 100 and 102 which will be retained in juxtaposed relationship as indicated at 104 by means of suitable machine bolts 106. The mating surfaces of the blocks 102 and 104 include centrally thereof in complementary relationship partial semi-spherical recesses 108 and 110, respectively, communicating with complementary semi-circular under cut portions 112, 114, and 116, 118, respectively, see Figure 3, opening into opposite sides of said blocks. The complementary surfaces of the blocks 100 and 102 include in communication with partial semi-spherical recesses complementary polygonally cross sectioned recess portions combining to form a recess 114 and 116, opening toward each other and receiving therein suitable support pins 118. The blocks 100 and 102 incorporate in the ends thereof suitably constructed complementary guide ribs 120 and 122 received within the ways formed by the ribs 70 and flanges 72 of the sides 64 and 66 of the support frame.

The blocks 100 and 102 have extending therefrom integral with the upper and lower portions thereof integral retaining pin portions 120 and 122, respectively. The top member 56 of the frame 54 has depending from the inner surface thereof a suitable abutment pin 124 in overlying aligned relationship with the pin 120. Extending vertically in aligned relationship with the abutment pin 122 and integral with the bottom 68 of the support frame 54 is a similar abutment pin 126. Circumposed about the aligned pins 120 and 124 and retained therebetween against displacement are opposite ends of a compression spring 128 conveniently described as a "load" spring for receiving the direct force of the weight transmitted through the chassis frame members 14 and 16. Circumposed between the aligned pins 122 and 126 against displacement therefrom are opposite ends of a suitable compression spring 130 conveniently described as a "pre-load" spring. The partial semi-spherical recesses 108 and 110 have extending therethrough a tubular sleeve member 132 incorporating an intermediate partial semi-spherical ball portion 134, see Figure 3, including diametrically opposed blind bore portions 136 and 138 which receive therein suitably conformed end portions of the pivot pins 119. The pins 119 will permit the tubular sleeve 132 to have a vertical pivotal movement on a plane substantially normal to the longitudinal axis of the chassis frame members 14 and 16, this pivotal movement being indicated by the dotted arcuate direction arrows in Figure 3. Extending longitudinally through the tubular sleeve 132 is an axle shaft 140, one end portion of which being operatively connected to the power wheel assemblies 36 and 38 the other end of which being suitably splined as indicated at 142 and reciprocably received in the splined bore portion 96 of the sleeve 94, see Figure 3. Circumposed about an intermediate portion of the axle shaft 140 is an annular retaining collar 144 incorporating a transverse lock screw 146 therethrough engageable with the outer surface of the axle shaft 140. When the wheels 36 and 38 strike an obstruction or encounter a depression in a running surface, each of the wheels will independently have a "knee action" the cooperating splines previously mentioned permitting the vertical pivotal movement of the tubular housing 132 in conjunction with the axle shaft 140 retained therein.

The wheel suspension assemblies 46 and 48 cooperating with the front axle assembly 40 are identical in all respects with the wheel suspension assemblies 50 and 52. However, the sides 64 and 66 of the frames 54 of the wheel suspension assemblies 44 and 46 have extending transversely therebetween the chassis frame members 14 and 16 elongated support members 148 and 150, see Figures 1 and 2, having extending transversely therebetween in substantial alignment with the longitudinal axis of the chassis frame 12 a suitable support shaft 152. The support shaft 152 has journaled thereon suitable transversely apertured overlying bearing elements 154 and 156 having extending integrally and laterally therefrom tubular sleeve elements 158 and 160, respectively, incorporating an outwardly opening internally splined bore portion 162 and 164, respectively. The front axle assembly 40 incorporates suitable axle shafts extending through tubular sleeves 132' similar in character to the tubular sleeves 132 of the rear axle assembly 42, said axles having a splined terminal end portion 166 received within the internally splined bore portions 162 and 164 of the sleeve elements 158 and 160.

Although not shown, suitable means are incorporated for adjusting the "caster and camber" of front wheels, and suitable grease seals are provided where necessary.

Thus there has been disclosed novel wheel suspension means independently permitting "knee action" in each of the ground engaging wheels of a vehicle, permitting the chassis frame to be relatively "low slung" accordingly lowering the center of gravity of a vehicle incorporating the novel wheel suspension assemblies.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. In a vehicle, a chassis, frame including a pair of longitudinally extending chassis frame members, power and steering wheel assemblies on the chassis frame members, said power and steering wheel assemblies including independent wheel suspension assemblies comprising support frames in longitudinally spaced relation on the longitudinally extending chassis frame members, vertically reciprocable support block means on the support frames, spring means on the support frames cushioning vertical reciprocable movement thereof and receiving thereon the load imposed on the chassis frame, a support axle extending transversely of the support block means for supporting a laterally disposed ground engaging wheel, pivot means on the support block means engaging said axles permitting independent vertical pivotal movement thereof in a plane normal to the longitudinal axes of the chassis frame members and relative to the support block means and chassis frame members, said axles including a longitudinally displaceable section extending between the chassis frame members compensating for the vertical pivotal movement thereof in the support block means, and pivot means on the chassis frame parallel to the longitudinal axis thereof and operatively connected to the axles.

2. In a vehicle, a chassis frame including a pair of longitudinally extending chassis frame members, power and steering wheel assemblies on the chasis frame members, said power and steering wheel assemblies including independent wheel suspension assemblies comprising support frames in longitudinally spaced relation on the longitudinally extending chassis frame members, vertically reciprocable support block means on the support frames, spring means on the support frames cushioning vertical reciprocable movement thereof and receiving thereon the load imposed on the chassis frame, a support axle extending transversely of the support block means for supporting a laterally disposed ground engaging wheel, pivot means on the support block means engaging said axles permitting independent vertical pivotal movement thereof in a plane normal to the longitudinal axes of the chassis frame members and relative to the support block means and chassis frame members, the support frames extending transversely of the chassis frame members for permitting a low center of gravity to be obtained in a vehicle incorporating the same, guide means extending between the support frames and the block means maintaining the block means in uni-planar vertical reciprocable relationship relative to the support frames, said spring means comprising coil springs interposed between upper and lower portions of the block means and the support frames, said axles including a longitudinally displaceable section extending between the chassis frame members compensating for the vertical pivotal movement thereof in the support block means, and pivot means on the chassis frame parallel to the longitudinal axis thereof and operatively connected to the axles.

References Cited in the file of this patent

UNITED STATES PATENTS

| | | |
|---|---|---|
| 980,589 | Bostian | Jan. 3, 1911 |
| 2,174,320 | Gonard | Sept. 26, 1939 |